United States Patent [19]

Bläse et al.

[11] Patent Number: 5,468,019
[45] Date of Patent: Nov. 21, 1995

[54] BELT PRETENSIONER WITH A PYROTECHNIC GAS GENERATOR

[75] Inventors: Meinhard Bläse, Mutlangen; Helmut Mika, Waldstetten, both of Germany

[73] Assignee: TRW Repa GmbH, Alfdorf, Germany

[21] Appl. No.: 213,193

[22] Filed: Mar. 14, 1994

[30] Foreign Application Priority Data

Mar. 20, 1993 [DE] Germany ............ 93 04 152.7

[51] Int. Cl.⁶ .................................. B60R 22/46
[52] U.S. Cl. .................. 280/805; 280/806; 297/480
[58] Field of Search .................. 280/801 R, 806, 280/808, 805; 297/478, 480; 188/376, 377

[56] References Cited

U.S. PATENT DOCUMENTS

| | | | |
|---|---|---|---|
| 3,999,780 | 12/1976 | Matsuoka et al. | 280/805 |
| 4,423,846 | 1/1984 | Fohl | 280/806 |
| 4,449,443 | 5/1984 | Föhl | 60/636 |
| 4,573,322 | 3/1986 | Föhl | 280/806 |
| 4,927,175 | 5/1990 | Föhl | 280/806 |
| 5,037,134 | 8/1991 | Tabata | 280/806 |
| 5,350,194 | 9/1994 | Föhl | 280/806 |

FOREIGN PATENT DOCUMENTS

| | | |
|---|---|---|
| 558963 | 9/1993 | European Pat. Off. . |
| 8406217 | 10/1985 | Germany . |
| 2217181 | 10/1989 | United Kingdom . |

Primary Examiner—Margaret A. Focarino
Assistant Examiner—Paul N. Dickson
Attorney, Agent, or Firm—Tarolli, Sundheim & Covell

[57] ABSTRACT

The piston of a piston/cylinder unit of a belt pretensioner with a pyrotechnic gas generator is characterized in that the piston is made from a first metallic piston part (12) which is firmly connected with the cable (16) and at least one second piston part (14) made of a thermoplastic material, at least one section of which is arranged on the side of the first piston part (12) facing the gas generator and forms a sealing contact with the walls of the cylinder. This arrangement creates the constructional prerequisites for further advantageous developments of the piston as regards the safety of the belt pretensioner. In particular, the piston can be equipped with a sealing lip which releases itself from the inner walls of the cylinder of the piston/cylinder unit when the unit is heated, e.g. in a vehicle fire, and so offers an escape path for the gases in order to avoid the danger of explosion. Furthermore, damping fixtures can be provided on the piston in order to reduce load peaks which occur at the beginning of the pretensioning operation.

12 Claims, 3 Drawing Sheets 5,468,019

BELT PRETENSIONER WITH A PYROTECHNIC GAS GENERATOR

BACKGROUND OF THE INVENTION

The invention relates to a belt pretensioner with a pyrotechnic gas generator and a piston/cylinder unit which may be activated by the generated gases and whose piston is connected with a cable.

These types of belt pretensioners are known in various constructional designs. The gas pressure created by the pyrotechnic gas generator results within milliseconds after its activation via a sensor unit, and subjects the piston and the cable connected to it to very high stresses at the beginning of the pretensioning action. The high gas pressure created by the gas generator acts on the piston and accelerates it in the direction of a piston-catching safety device, thus causing the cable to be jerked in the direction of the piston-catching safety device. Strong forces therefore act on both the piston and the cable during the pretensioning operation.

Similarly high stresses can act on a belt pretensioner in the case of a non-intended heat effect when the supplied energy provokes false activation of the gas generator. This is the case, e.g. in a vehicle fire, or in a bonfire test which simulates the former.

For safety reasons, belt pretensioners have to be so designed that they cannot explode or disintegrate into sharp-edged or heavy flying objects in the case of a non-intended, false detonation of the gas generator, e.g. in a vehicle fire, and also not be damaged by the high stresses occurring at the beginning of the pretensioning operation in the case of a correct operational detonation.

SUMMARY OF THE INVENTION

The belt pretensioner with the features listed initially is characterized in accordance with the invention in that the piston comprises a first metallic piston part, which is firmly connected with the cable, and at least one second piston part made from a thermoplastic material, at least one section of which is arranged on the side of the first piston part facing the gas generator, and which forms a sealing contact with the inner wall of the cylinder.

The invention is based on the recognition that by the division of the piston into two parts, a metallic and a thermoplastic piston part, numerous constructional measures can be adopted which enable the safety requirements of the belt pretensioner to be met.

For a better understanding of the invention, the main functions of a piston in a piston/cylinder unit of a belt pretensioner will be dealt with briefly in the following. The most important function is naturally the conversion of the pressure force, caused by the gas pressure created in a gas generator, acting on the piston into a pulling force in the cable, which is used for tensioning the safety belt. A high mechanic stability is necessary for the transfer of force from the piston to the cable, in particular at the transition between the piston and the cable.

A second important function of the piston is the formation of a seal between it and the inner wall of the cylinder in order to convert the pressure made available by the gas generator into a piston movement without large losses.

A third important, and in accordance with the invention, additional intended function of the piston is the provision of some means of damping between the piston and the cable, because enormous piston accelerations can occur when high performance gas generators are used due to the very fast increasing pressure in the cylinder of the piston/cylinder unit at the beginning of the tensioning operation, which lead to stress peaks in the cable and in the belt tensioner connected to the cable. In order to guarantee the operational safety of the belt pretensioner in spite of this, the components subjected to these stress peaks have to be dimensioned with this peak load in mind instead of the actual operational load, which is lower than the peak load.

The construction of the piston from one first and at least one second piston part, in accordance with the invention, now enables a better realization of these functions through suitable selection of materials and suitable characteristic constructional features than was possible in the state of the art. The first piston part, which primarily effects the feeding of the force to the cable, is preferably comprised of a steel material which demonstrates sufficient stability while permitting the employment of a small amount of material. The second piston part, which primarily effects the damping and sealing functions, is specifically less stressed and is made from a more malleable material which enables the realisation of the arrangements necessary for the described functions at a reasonable price.

In accordance with a first aspect of the invention, it is possible on the basis of this division into two parts, to influence the accelerational behaviour of the piston and the cable during the pretensioning operation, and thereby have an effect on the high load at the beginning of this pretensioning operation. To this purpose, the first piston part is firmly connected with the cable, and at least one section of the second piston part is arranged on the side of the first piston part facing the gas generator. The invention is designed to reduce the maximum force subjected on the first piston part during the pretensioning operation and the force emanating from this part and acting on the cable, in that some means of damping is envisaged for between the first and second piston parts. These means of damping can in particular be formed by elevations and/or depressions, which are formed on the first piston part and/or on the second piston part.

An alternative to this can be an elastomer plate for example, which forms the means of damping. It can also be appropriate to arrange the second piston part at some distance from the first piston part, as this would result in a delay in the effect of the force acting on the first piston part.

With a view to the production of the second piston part at a reasonable price, this can be constructed from several parts, preferably from two parts made by dividing the second piston part along its length, which can then be clipped together during the assembly.

In accordance with a second aspect of the invention, a safe seal can be formed in order to prevent the axial flow-through of gas from one side of the second piston part to its other side, but which would release itself in a possible vehicle fire. Due to the seal, the gas pressure created by the gas generator during the pretensioning operation can act on the piston essentially loss-free. In the case of e.g. a vehicle fire, however, the thermoplastic material of the second piston part would deform. A passage would thus result, either through the second piston part, or around it. The gas thus first passes through the passage on the second piston part, which occurs as a result of elastic deformation, and will eventually (depending on the arrangement of the first piston part in relation to the second) pass the heat resistant but non-sealing first piston part. In this manner, the gas can escape through the open end of the piston/cylinder unit of the piston catching safety device, and an explosion of the unit due to the effect of heat can thus be avoided.

As a matter of principle, it is possible for the seal to be designed in a number of different ways. From the point of view of production technology and for the formation of a passage of the second piston part in the case of a fire, it is however, expedient when the seal is constructed as a sealing lip which is moulded on the second piston part according to the invention.

In accordance with a further advantageous development of the invention, the first piston part has a smaller diameter than the second piston part. The gas which initially flows past the second part if there is a fire may then flow more rapidly past the first piston part.

The piston can be made with smaller longitudinal extension than normal pistons without having a negative effect on its stability, due to the reduced load during the pretensioning operation, which results from a two-part construction of the piston in accordance with the invention. Consequently, it is possible for the length of the cylinder during the pretensioning operation, that is during the working stroke of the piston, to be more effectively exploited. Furthermore, the advantages associated with the multi-part construction of the second piston part 14 lead to a reduction in production costs.

DESCRIPTION OF THE DRAWINGS

Further advantageous forms of the invention are cited in the subclaims.

Further characteristic features and advantages of the invention ensue from the following description and from the drawings which will be referred to. The drawings show.

DESCRIPTION OF THE INVENTION

Figure 1:
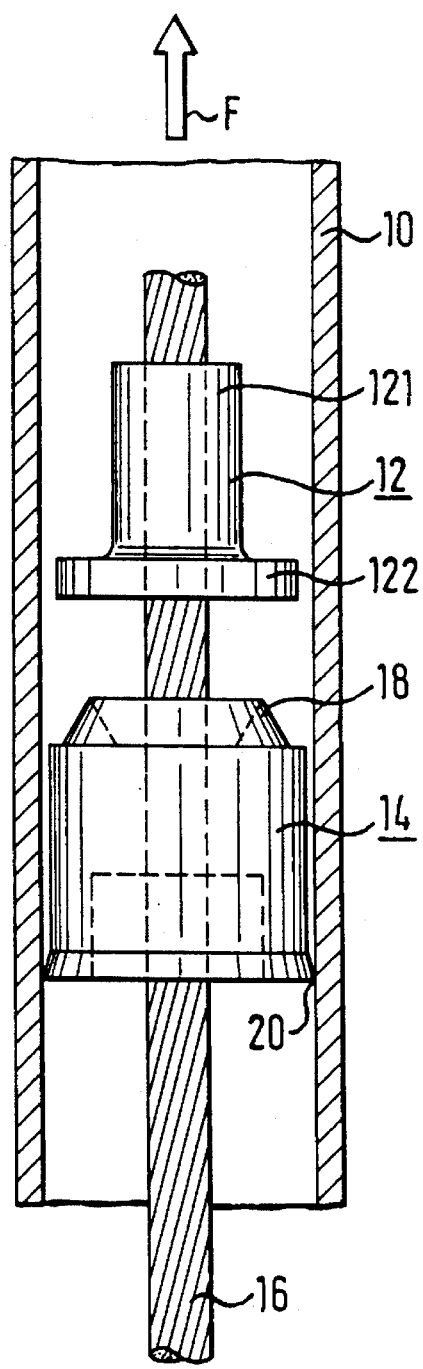
FIG. 1 a partial section through a cylinder with piston in accordance with a first embodiment of the invention.

FIG. 1 shows a section through a cylinder 10 of a belt pretensioner with a first piston part 12 and a second piston part 14 in accordance with a first embodiment of the invention. The first piston part 12 is made from a steel material and is pressed together with a cable 16. The cable is connected in a known manner with a belt winder, which is not shown here. The first piston part 12 comprises a sleeve 121 which surrounds the cable 16, onto which an abutment plate 122 extending essentially transversely in relation to the cable 16 is adjoined on the side facing the second piston part 14. The sleeve 121 and the abutment plate 122 are of integral construction and form the first piston part 12.

The second piston part 14 is essentially of cylindrical form and has a larger diameter than the first piston part 12. This has a passage for the cable 16 and an annular raised portion 18 on its front end facing the first piston part 12, concentric with the second piston part 14.

The second piston part 14 is arranged at a distance from the first piston part 12 and is conically widened towards the gas generator at the end section facing the gas generator, not shown, so that the portion with the largest diameter of the second piston part 14 makes contact with the cylinder 10. By means of this arrangement, a sealing lip 20 is formed, which prevents a flow-through of gas from the side of the second piston part 14 facing towards the gas generator to the side facing the first piston part 12.

The second piston part 14 is slidably arranged along the cable 16. In this manner, the gas pressure resulting from the detonation of the gas generator for the belt pretensioning operation hits the second piston part 14 first. This is then accelerated onto the first piston part 12 in the direction of the arrow F. The raised annular part 18 acts as a means of damping on contact with the abutment plate 122 of the first piston part 12, in that it is plastically deformed as a result of the collision with the abutment plate 122 of the first piston part 12. Furthermore, more distant parts of the first piston part 12 yield elastically. The maximum force acting on the first piston part 12, and consequently on the cable 16, is thus reduced, so that peak loads during the pretensioning operation can be reduced and the jerky tensioning of the cable can be avoided. As a result of the damped acceleration of the first piston pan 12 and the cable 16, both the cable 16 and the piston can be constructed with reduced dimensions.

As the second piston part consists of a thermoplastic material, the sealing lip 20, which makes contact with the inner wall of the cylinder 10, will be released from the piston part when the thermoplastic material is subjected to heat, e.g. in a vehicle fire. The gas created by the possible false detonation can then firstly pass the second piston part and subsequently the first piston pan 12, and escape through the open piston-catching safety device, whereby the danger of explosion is eliminated in a simple fashion.

Figure 2:
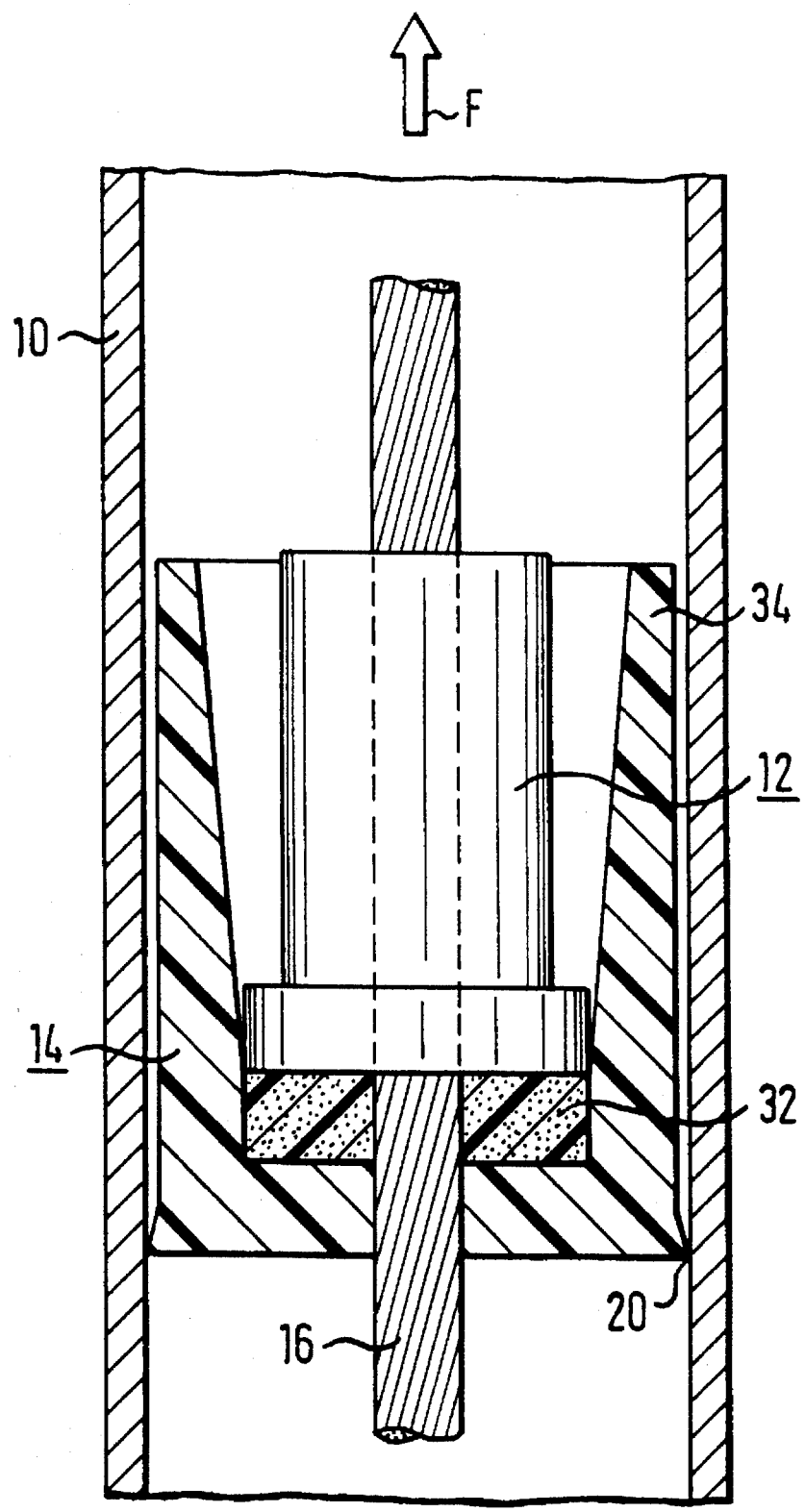
FIG. 2 a partial section through a cylinder and the second piston part with the first piston part in accordance with a further embodiment of the invention.

A further embodiment of the piston in accordance with the invention is shown in FIG. 2. Components in this drawing with the same function as components in FIG. 1 carry the same reference numerals.

The second piston part 14 of this embodiment is of a hollow cylindrical construction. The first piston part 12 is arranged within the second piston part 14, and is so dimensioned that the external diameter of the abutment plate of the first piston part 12 is smaller than or equal to the inner diameter of the receptacle for the first piston part 12 in the second piston part 14. An elastomer plate 32 is arranged between the first piston part 12 and the second piston part 14 as a means of damping. The first piston part 12, the second piston part 14 and the elastomer plate 32 are arranged lying on top of one another. They may, however, also be intentionally set at some distance from one another.

In this case too, the second piston part 14 has a sealing lip 20 as was already described in reference to FIG. 1, and which releases itself from the construction when warmed in the manner described above.

The side wall 34 of the second piston part 14 is tapered towards the piston-catching safety device, not shown, of the belt pretensioner. The second piston part 14 is arranged on the side of the first piston part 12 facing towards the gas generator. The tapering of the side walls of the second piston part 14 creams additional room along the sides between the first piston part 12 and the second piston part 14. This has the advantage, that the thermoplastic material of the second piston part 14 moves inwards under the effect of warming, for example in a vehicle fire, and under the effect of the gas pressure created by a false detonation, and that the gas produced can pass the second piston part 14 more easily. In this case too, the gas escapes through the open piston-catching safety device, thus eliminating the danger of explosion.

In this embodiment, an elastomer plate 32, which is set between the first piston part 12 and the second piston part 14, takes over the damping function described in reference to FIG. 1 in order to reduce peak loads on the first piston part 12 during the pretensioning operation.

Figure 3:
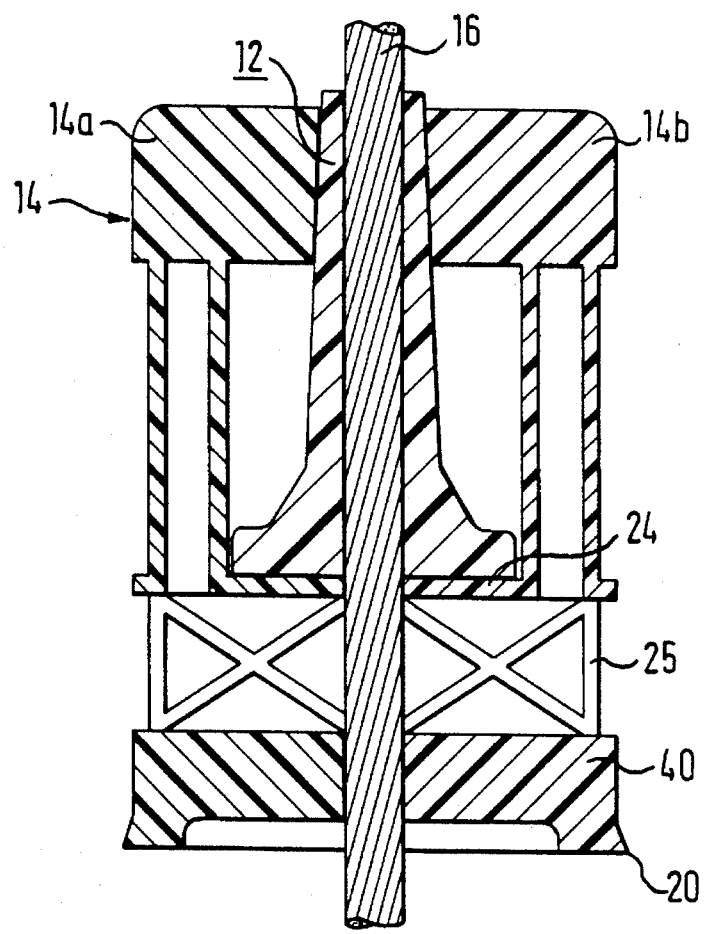
FIG. 3 a section through the first and the second piston parts in accordance with a further embodiment of the invention.

A further embodiment of the invention is shown in FIG. 3, which allows the production of the second piston part 14 in particular at a reasonable price. In accordance with this embodiment, the second piston part 14 is divided longitudinally into two parts, 14a and 14b. It consists preferably of two halves which are essentially symmetrical with reference to a plane running through the central axis of the cable 16. During the assembly, after pressing the piston part 12 onto the cable 16, these two halves can be clipped around the piston part 12 onto the cable 16 so that the first piston part 12 and the second piston part 14 form one unit. A sealing lip 20 and a means of damping on the second piston part 14 have also been envisaged in this embodiment and would have the same functions as described in reference to FIG. 1 and FIG. 2. The means of damping in this embodiment consist of a deformable trellis-like construction 25, which is arranged between a front plate 40 of the second piston part 14, equipped with a sealing lip 20, and an abutment plate 24 for the first piston part 12.

Figure 4:
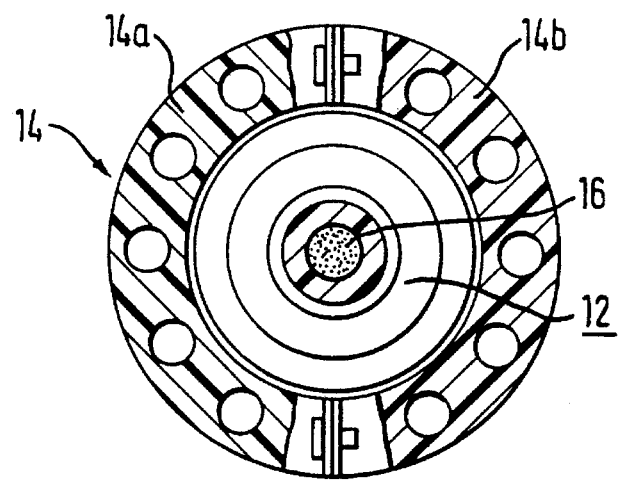
FIG. 4 a section through the first and the second piston parts from FIG. 3.

FIG. 4 shows a section through the first piston part 12 and the second piston part 14. The formation of the second piston part from two essentially symmetrical halves, 14a and 14b, is clearly recognizable.

Figure 5:
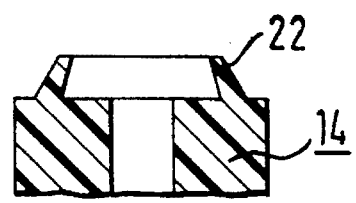
FIG. 5 a partial section through the second piston part in accordance with a further embodiment of the invention.
Figure 6:
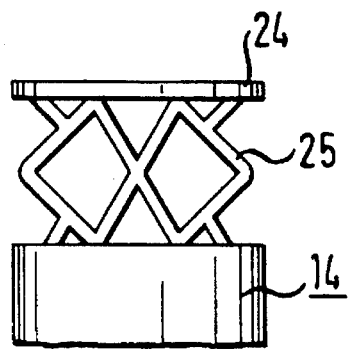
FIG. 6 a partial side view of the second piston part in accordance with a further embodiment of the invention.
Figure 7:
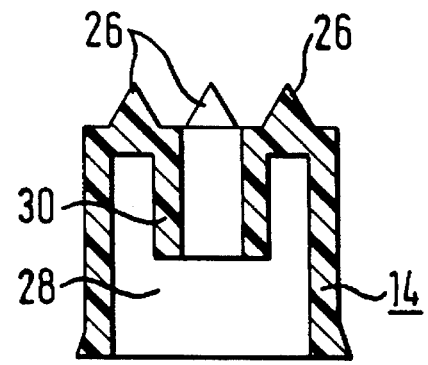
FIG. 7 a partial section through the second piston part in accordance with a further embodiment of the invention.

In FIGS. 5 to 7, further embodiments of the second piston part 14 are shown, which can be used in particular in association with the embodiment shown in FIG. 1.

In FIG. 5, the upper region of the second piston part 14 is shown, which has a raised annular portion 22 on the side facing towards the first piston part 12 and is similar to the raised portion 18 in FIG. 1. In contrast to the construction in FIG. 1 this raised annular part 22 is undercut on the inner side of the ring. In this, and in the following embodiments, a passage has been formed in the middle of the piston part 14 for the cable 16.

In FIG. 6, the abutment plate 24 for the first piston part 12 is shown, which is connected to the front side of the second piston part 14 facing the first piston part 12 by means of a trellis-like construction 25.

In FIG. 7, a second piston part 14 of hollow cylindrical construction is shown, onto which individual conical raised parts 26 have been moulded on the front side facing the first piston part 12. A sleeve 30 projects into a recess 28 from the front end of the second piston part 14 and is concentric with the second piston part 14.

All of the embodiments shown in accordance with the invention in the FIGS. 5 to 7, with regards to the front part of the second piston part 14, serve as a means of damping the collision of the second piston part 14 with the first piston part 12 in the direction of motion of the second piston part 14 during the pretensioning operation. The construction of the embodiment in FIG. 5 dampens the collision of the second piston part 14 by means of elastic and plastic deformation, in that the annular raised part 22 first undergoes plastic deformation and subsequently the remaining portion of the second piston part 14 yields elastically. The embodiment shown in FIG. 6 dampens the collision through elastic yielding of the trellis-like structure 25, and the embodiment in FIG. 7 dampens the collision of the second piston part 14 with the first piston part 12 essentially through plastic deformation of the front part of the second piston part 14 into the recess 28.

The thermoplastic material for the second piston part 14 can be of polypropylene, polyamide or polyformaldehyde in all of the embodiments shown.

What is claimed is:

1. A drive unit for a pretensioner in a vehicle safety belt system, comprising a cylinder, a piston slidably received in said cylinder, a cable connected to said piston, and a pyrotechnic gas generator which produces pressurized gas upon vehicle-sensitive activation to drive said piston through said cylinder, said piston being formed of a first metallic piston part firmly connected with said cable and at least a second piston part made from a thermoplastic material and forming a sealing contact with said cylinder, and damping means between said first piston part and said second piston part, said damping means comprising raised conical portions connected with said second piston part and facing said first piston part and being designed to deform under the action of a force.

2. The drive unit of claim 1, wherein said second piston part is located on a side of said first piston part facing said gas generator.

3. The drive unit of claim 2, wherein said second piston part is slidably arranged on said cable at an axial distance from said first piston part.

4. The drive unit of claim 1, wherein said thermoplastic material is designed to deform in the event of a vehicle fire.

5. The drive unit of claim 4, wherein said damping means are molded onto said second piston part.

6. The drive unit of claim 4, wherein said first piston part has a smaller external diameter than said second piston part.

7. The drive unit of claim 1, wherein said second piston part has a seal for sealing between said second piston part and said cylinder.

8. The drive unit of claim 7, wherein a sealing lip molded on said second piston part forms said seal.

9. The drive unit of claim 8, wherein said sealing lip is arranged on a side of said second piston part facing said gas generator.

10. The drive unit of claim 1, wherein said second piston part is longitudinally divided into two parts.

11. The drive unit of claim 1, wherein said second piston part is made of a material selected from the group consisting of polypropylene, polyamide and polyformaldehyde.

12. The drive unit of claim 1, wherein said second piston part has a recess, said recess located on the side of said second piston part facing said gas generator.

* * * * *